United States Patent
Arnold et al.

(10) Patent No.: US 10,642,516 B2
(45) Date of Patent: May 5, 2020

(54) EXTERNAL HARD DRIVE DEVICE WITH CLOUD DRIVE SUPPORT

(71) Applicant: Seagate Technology LLC, Cupertino, CA (US)

(72) Inventors: Kevin Arnold, Cupertino, CA (US); Jeff Ma, Cupertino, CA (US); Yuliya Kahuashvili, Cupertino, CA (US); Timothy Bucher, Geyserville, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 366 days.

(21) Appl. No.: 15/391,097

(22) Filed: Dec. 27, 2016

(65) Prior Publication Data

US 2017/0192707 A1    Jul. 6, 2017

Related U.S. Application Data

(60) Provisional application No. 62/273,384, filed on Dec. 30, 2015.

(51) Int. Cl.
*G06F 3/06* (2006.01)
*G06F 16/182* (2019.01)

(52) U.S. Cl.
CPC .......... *G06F 3/0632* (2013.01); *G06F 3/0604* (2013.01); *G06F 3/067* (2013.01); *G06F 3/0643* (2013.01); *G06F 16/182* (2019.01)

(58) Field of Classification Search
None
See application file for complete search history.

(56) References Cited

U.S. PATENT DOCUMENTS

| 7,747,982 | B1 * | 6/2010 | Sie | H04N 7/17336 717/118 |
|---|---|---|---|---|
| 8,621,451 | B1 * | 12/2013 | Morley | G06F 8/61 717/172 |
| 8,650,157 | B1 * | 2/2014 | Jha | G06F 11/1456 707/640 |
| 2004/0023683 | A1 * | 2/2004 | Mizuhiki | G06F 3/0619 455/550.1 |
| 2005/0120170 | A1 * | 6/2005 | Zhu | G06F 3/0607 711/114 |
| 2007/0124536 | A1 * | 5/2007 | Carper | G06F 12/1466 711/115 |
| 2010/0332401 | A1 * | 12/2010 | Prahlad | G06F 16/1844 705/80 |
| 2011/0113205 | A1 * | 5/2011 | Garcia Puga | H04L 67/1095 711/160 |
| 2012/0073482 | A1 * | 3/2012 | Meeker | E05G 1/00 109/23 |

(Continued)

*Primary Examiner* — Jason D Mitchell
(74) *Attorney, Agent, or Firm* — Westman, Champlin & Koehler, P.A.

(57) ABSTRACT

Systems and methods are disclosed to execute a startup program on a computer, the startup program being stored on an external storage device connected with the computer; download a file management program from a remote server to the computer; install the file management program on the computer; send a message to a cloud storage management server requesting the creation of a cloud storage account associated with the external storage device; and receive an indication that the cloud storage account has been created.

18 Claims, 4 Drawing Sheets

(56) References Cited

U.S. PATENT DOCUMENTS

| | | | |
|---|---|---|---|
| 2014/0047070 A1* | 2/2014 | Lee | H04L 67/02 709/219 |
| 2014/0052825 A1* | 2/2014 | Luecke | H04L 67/327 709/219 |
| 2014/0059656 A1* | 2/2014 | Maeda | H04W 12/08 726/4 |
| 2014/0082717 A1* | 3/2014 | Kang | G06F 21/00 726/9 |
| 2015/0052353 A1* | 2/2015 | Kang | G06F 21/6218 713/165 |
| 2015/0058566 A1* | 2/2015 | Yoon | G11C 13/004 711/118 |
| 2015/0142765 A1* | 5/2015 | Hong | G06F 16/178 707/698 |
| 2016/0063026 A1* | 3/2016 | Mokhtarzada | G06F 16/10 707/617 |
| 2016/0078237 A1* | 3/2016 | Tan | G06F 16/1824 726/28 |
| 2016/0162371 A1* | 6/2016 | Prabhu | G06F 11/1461 707/654 |
| 2016/0191618 A1* | 6/2016 | Shi | H04L 67/1095 707/610 |
| 2017/0359353 A1* | 12/2017 | Tan | G06F 3/0605 |

* cited by examiner

EXTERNAL HARD DRIVE DEVICE WITH CLOUD DRIVE SUPPORT

CLAIM OF PRIORITY

This application claims the benefit of U.S. Provisional Patent Application Ser. No. 62/273,384 filed on Dec. 30, 2015, the entire disclosure of which is hereby incorporated by reference in its entirety.

SUMMARY

Systems and methods are disclosed to execute a startup program on a computer, the startup program being stored on an external storage device connected with the computer; download a file management program from a remote server to the computer; install the file management program on the computer; send a message to a cloud storage management server requesting the creation of a cloud storage account associated with the external storage device; and receive an indication that the cloud storage account has been created.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for linking an external storage device with a cloud storage location. The external storage device may be linked with a cloud storage location such that when a file (or data) is saved in the external storage device, the file is also saved at a cloud location. The link between the cloud storage and the external storage device may occur when a user connects an external storage device with a computer and downloads software to the computer to automatically link the external storage device with the cloud storage.

Figure 1:
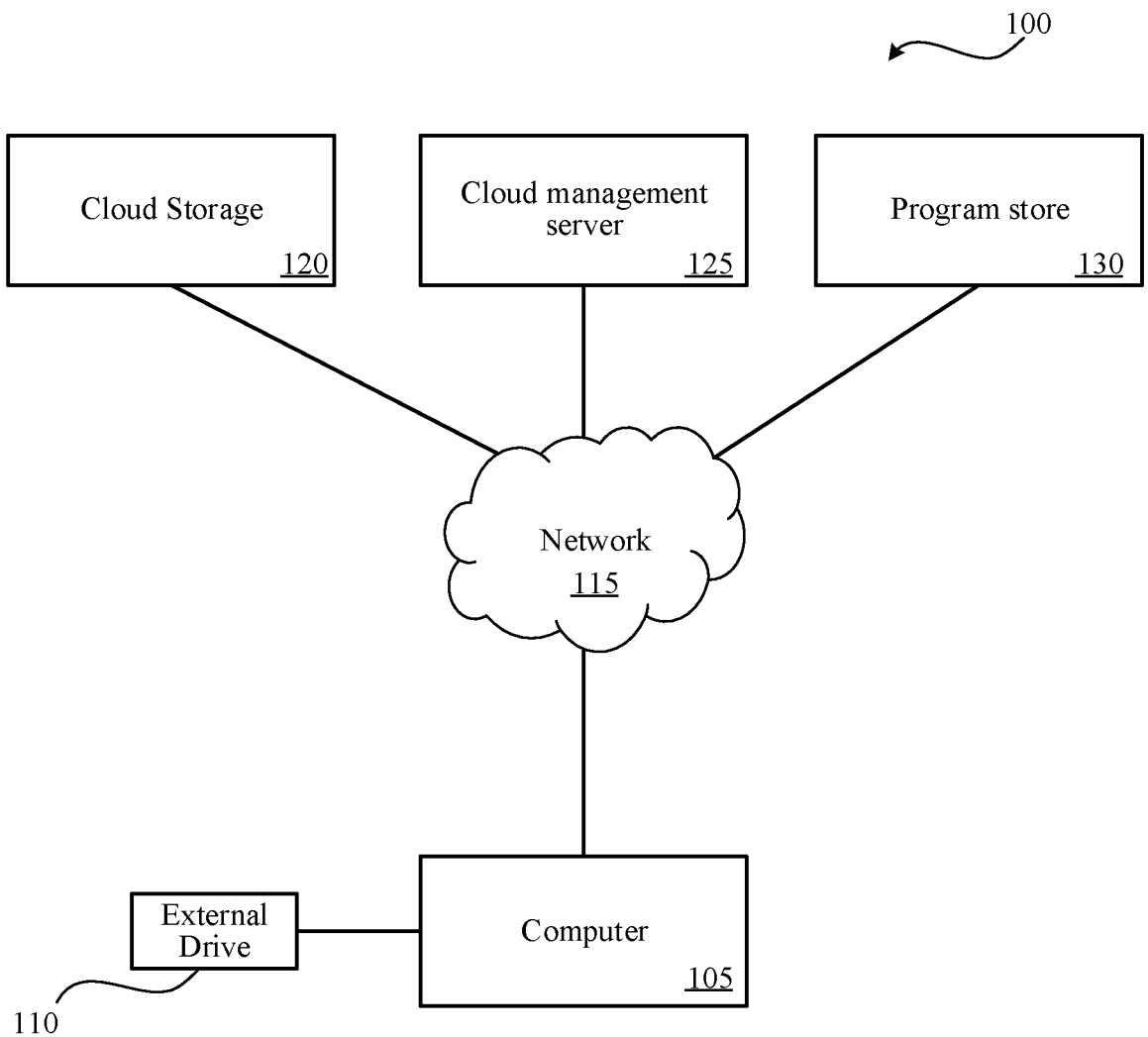
FIG. 1 is an example block diagram of an external storage device and cloud storage system 100 with cloud drive support according to some embodiments of the invention.

FIG. 1 is an example external storage device and cloud storage system 100 with cloud drive support according to some embodiments. The external storage device and cloud storage system 100 may include a computer 105 coupled with external storage device 110 and a network 115. The computer 105 may also be in communication with a cloud storage system 120, a cloud management server 125, and/or a program store 130 via the network 115. The computer 105 may include any or all of the components shown in the computational system 400 shown in FIG. 4.

In some embodiments, the external storage device 110 may include any type of storage medium such as, for example, a solid state hard drive, USB memory stick, a magnetic hard disk drive, flash memory, a spinning disk, etc. The external storage device 110, for example, may be physically coupled with the computer 105 with a wire such as, for example, a USB cable, an HDMI cable, a thunderbolt cable, etc. The external storage device 110, for example, may be wirelessly coupled with the computer 105 such as, for example, via Wi-Fi, Bluetooth, or any other wireless communication network. In some embodiments, the external storage device 110 may communicate with the computer 105 via network 115. The external storage device 110 may include various software elements such as, for example, file management software and/or cloud set up software. The external storage device 110 may be formatted to work with computers using any type of operating system.

In some embodiments, the network 115 may include, either alone or in any suitable combination, the Internet, an Intranet, a local Wi-Fi network, a wireless LAN, a mobile network (e.g., a 3G, 4G, and/or LTE network), a LAN, a WAN, or any other suitable communication network. In some embodiments, the network 115 may be a combination of communication networks.

In some embodiments, the cloud storage system 120 may include any type of remote or network storage location that is accessible through the network 115. The cloud storage system 120, for example, may include a distributed storage location that includes one or more storage locations distributed geographically and in communication through the network 115.

In some embodiments, the cloud management server 125 may include any type of server or computer system in communication with the computer 105 through the network 115. The cloud management server 125 may act similar to a central service in a distributed storage system. The cloud management server 125 may be associated with a server operated by a third-party providing storage management services. The cloud management server 125 may include any or all of the components shown in the computational system 400 shown in FIG. 4. The cloud management server 125 may include one or more servers located in a single location or distributed throughout the network 115.

The cloud management server 125 may perform multiple functions in the external storage device and cloud storage system 100, such as coordinating actions of the computer 105 and/or the external storage device 110. For example, the functions of the cloud management server 125 may include, but are not limited to, locating data files in the cloud storage system 120, coordinating synchronization of data between the cloud storage system 120 and the external storage device 110 and/or the computer 105, allocating storage of data in the cloud storage system 120, and coordinating distribution of the data to the cloud storage system 120.

In some embodiments the cloud management server 125 may communicate with the computer 105 and/or the cloud storage system 120 via network 115. The cloud management server 125 may also be configured to communicate with the cloud storage system 120 via direct communication.

In some embodiments, the program store 130 may include downloadable programs that may be transferred from the program store 130 to the computer 105 via the network 115. In some embodiments, the program store 130 may include any or all of the components shown in the computational system 400 shown in FIG. 4.

Figure 2:
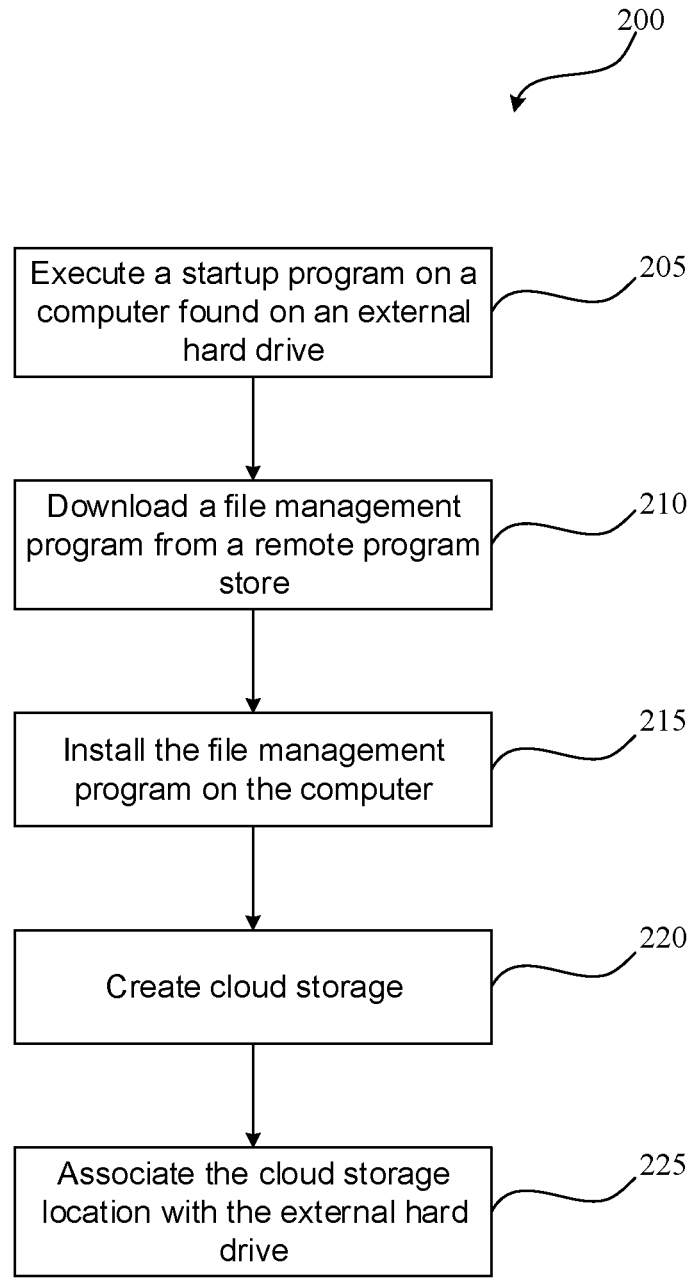
FIG. 2 is a flowchart of an example process that may be used to setup an external storage device linked with a cloud storage device according to some embodiments of the invention.

FIG. 2 is a flowchart of an example process 200 that may be used to setup an external storage device linked with a cloud storage device according to some embodiments of the invention. One or more steps of the process 200 may be implemented, in some embodiments, by one or more components of cloud storage system 100 of FIG. 1, such as, for example, with computer 105, external storage device 110, and/or program store 130. Although illustrated as discrete blocks, various blocks may be divided into additional blocks, combined into fewer blocks, or eliminated, depending on the desired implementation.

Process 200 starts at block 205. At block 205, a startup program may be executed on the computer 105. The computer program, for example, may be stored on the external storage device 110 and may be executed by a user through the computer 105. In some embodiments, a user may connect the external storage device 110 with the computer 105 and then execute the computer program in the external storage device.

At block 210 a file management program may be downloaded to the computer 105 from the program store 130. In some embodiments, the file management program may be sent to the computer 105 in response to a message sent to the program store 130 and/or the cloud management server 125. For example, when the computer executes the startup program, a message may be transmitted to the program store requesting that the file management program is downloaded to the computer 105. The message, for example, may be an HTML get message or any other type of request for data. The file management program, for example, may be sent to the computer 105 through the network 115.

In some embodiments, at block 215 the file management program may be installed on the computer 105 after it has been downloaded from the program store 130. In some embodiments, the file management program may include an API that allows the computer 105 to upload and/or download data (and/or files) to the cloud storage system 120.

In some embodiments, at block 220 a cloud storage account may be created. For example, the startup program or the file management program may send a request to the cloud management server 125 requesting that a cloud storage account be created. The message, for example, may include a unique identifier that identifies either the user and/or the external storage device 110. The unique identifier, for example, may include a username, and email address, passcode, a product ID, a serial number, etc. The message, for example, may also include a storage size of the external storage device 110. The message, for example, may also include the operating system used by the computer 105.

In some embodiments, the cloud management server 125 may initially create a cloud storage account that includes only a portion of the cloud storage system 120 and/or a portion of the total available storage of the external storage device 105. In some embodiments, the cloud storage account may have a size limitation that is associated with the size of the external storage device 110 or a size limitation that may be dynamically adjusted up to the size of the external storage device 110. In some embodiments, the initial size of the cloud storage account may be small but may grow dynamically as more data is added to the cloud storage. In some embodiments, the cloud storage account may be created with an expiration date.

In the embodiments, a block 225 the cloud storage account may be associated with the external storage device 110. For example, a lookup table may be saved within the cloud management server 125 that associate the unique identifier of the external device 110 with the storage locations associated with the cloud storage account. In some embodiments, more than one storage location may be associated with a unique identifier such as, for example, when the cloud storage location is distributed among a plurality of storage locations. In some embodiments, as the cloud storage requirements grow the lookup table may associate more cloud storage locations with a given unique identifier.

Figure 3:
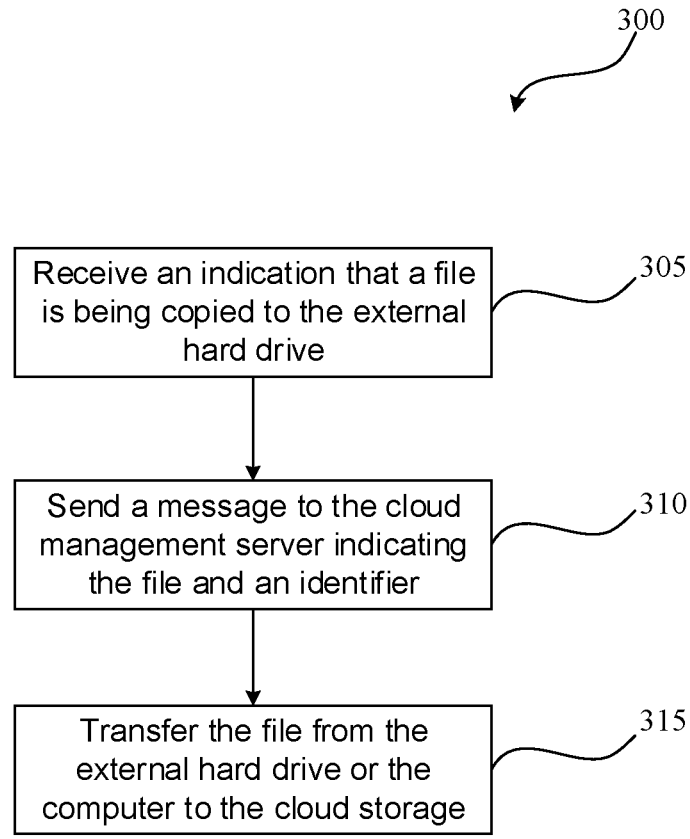
FIG. 3 is a flowchart of an example process that may be used to backup data saved to the external storage device at the cloud storage according to some embodiments of the invention.

FIG. 3 is a flowchart of an example process 300 that may be used to backup data saved to the external storage device 110 at the cloud storage system 120 according to some embodiments of the invention. One or more steps of the process 300 may be implemented, in some embodiments, by one or more components of cloud storage system 100 of FIG. 1, such as, for example, with computer 105, external storage device 110, cloud management server 125, and/or cloud storage system 120. Although illustrated as discrete blocks, various blocks may be divided into additional blocks, combined into fewer blocks, or eliminated, depending on the desired implementation.

Process 300 begins at block 305. At block 305, the file management software may receive an indication that a file or data is being saved to the external storage device 110. The indication, for example, may be received from the operating system executing on the computer 105.

In some embodiments, at block 310 a message may be sent to the cloud management server 125 indicating that the file should be backed up in cloud storage system 120. The message, for example, may include the unique identifier, the file type, the file size, the name of the file, the storage location of the file on the external storage device 110, and/or the location of the file on the computer 105. In some embodiments, the message maybe part of the API of the cloud storage system 120.

In some embodiments, at block 315 the file may be transferred to the cloud storage system 120. For example, the file may be transferred from the external storage device 110 and/or from the computer 105 to the cloud storage system 120 via the network 115. In some embodiments, blocks 310 and 315 may be combined. In some embodiments, the file may be transferred to the cloud storage in accordance with the API of the cloud storage system 120.

In some embodiments, if the file is being transferred from the computer 105 to the external storage device 110, the file may be sent to the cloud storage system 120 from the computer 105. The file may be deleted from the computer after it is copied to the external device 105 and after it has been transferred to the cloud storage system 120.

In some embodiments, if the file size of the file is greater than a threshold value, then the file may be uploaded to the cloud storage system 120 directly from the computer 105 rather than being uploaded from external storage device 110.

In some embodiments, a file located on the external storage device 110 may be modified, updated, or revised by a program executing on the computer 105. When the file is modified, updated, or revised, the file may be transferred to the cloud storage system 120 from the external storage device 110.

For example, a user of the computer 105 may interact with a number of files and folders stored on the computer 105 using Windows Explorer or Finder. While using the computer 105, the user may drag a file from a storage location on the computer 105 to a storage location on the external storage device 110. The file management program executing on the computer 105 may determine that a new file or new data is being saved to the external storage device 110. In response, the file management software may send a message to the cloud management server 125 that a file may be transferred to the cloud storage location. The message may include the unique identifier, a file name, a file size, etc. In response, the cloud management server 125 may allocate storage and/or provide a network address to the computer 105 that indicates a storage location at the cloud storage system 120 where the file should be saved. The computer 105 may upload the file to the cloud storage system 120.

As another example, a user of the computer 105 may interact with a number of files and folders stored on the computer 105 using Windows Explorer or Finder. While using the computer 105, the user may drag a file from a storage location on the computer 105 to a storage location on the external storage device 110. The file management program executing on the computer 105 may determine that a new file or new data is being saved to the external storage device 110. In response, the file management software executing on the computer 105 may upload the file to the cloud storage system 120.

In some embodiments, if the file should be removed from the computer 105 after is transferred to the external storage device 110, then rather than deleting the file from the computer 105, the file may be held at the computer 105 until it is uploaded to the cloud storage system 120 and then deleted from the computer 105.

In some embodiments, if the available storage in the external storage device 110 is less than the size of the new file being transferred to the external storage device 110, then the external storage device may delete an aged file to make room for the new file. An aged file, for example, may include a file that has not been accessed or modified for more than a certain period of time. An aged file, for example, may also include a file that is saved at the cloud storage system 120. In some embodiments, an icon representing the deleted aged file may still be displayed in a folder representing the external storage device 110 despite the aged file no longer being saved within the external storage device 110. If the user selects the icon representing the aged file may be downloaded from the cloud storage system 120.

Figure 4:
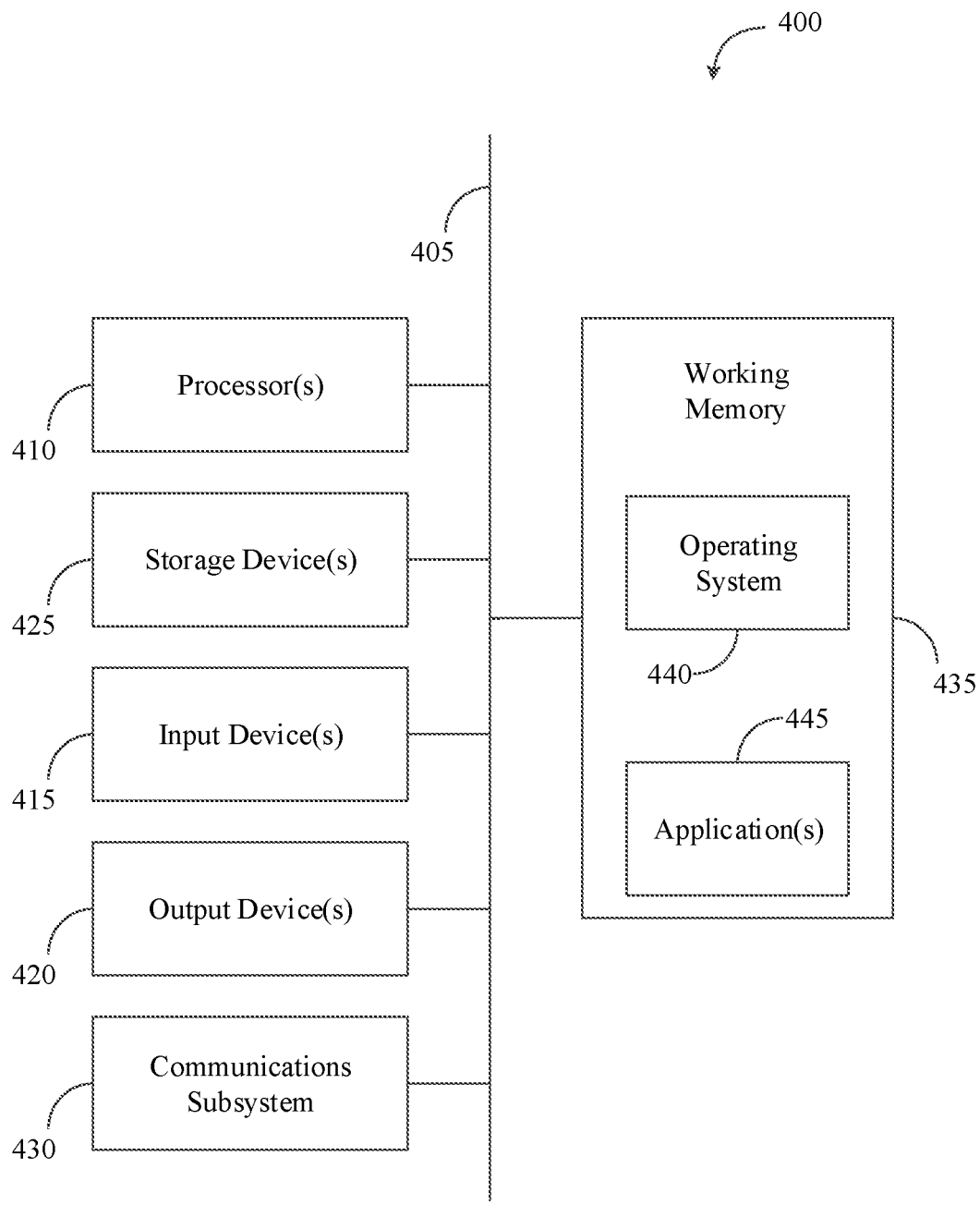
FIG. 4 is a block diagram of an illustrative computational system for performing functionality to facilitate implementation of embodiments described herein.

The computational system 400 (or processing unit) illustrated in FIG. 4 can be used to perform and/or control operation of any of the embodiments described herein. For example, the computational system 400 can be used alone or in conjunction with other components. As another example, the computational system 400 can be used to perform any calculation, solve any equation, perform any identification, and/or make any determination described here.

The computational system 400 may include any or all of the hardware elements shown in the figure and described herein. The computational system 400 may include hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard, and/or the like; and one or more output devices 420, which can include, without limitation, a display device, a printer, and/or the like.

The computational system 400 may further include (and/or be in communication with) one or more storage devices 425, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 400 might also include a communications subsystem 430, which can include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 430 may permit data to be exchanged with a network (such as the network described below, to name one example) and/or any other devices described herein. In many embodiments, the computational system 400 will further include a working memory 435, which can include a RAM or ROM device, as described above.

The computational system 400 also can include software elements, shown as being currently located within the working memory 435, including an operating system 440 and/or other code, such as one or more application programs 445, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 425 described above.

In some cases, the storage medium might be incorporated within the computational system 400 or in communication with the computational system 400. In other embodiments, the storage medium might be separate from the computational system 400 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for—purposes of example rather than limitation, and does not preclude inclusion of such modifications, variations, and/or additions to the present subject matter as would be readily apparent to one of ordinary skill in the art.

That which is claimed:

1. A method comprising:
    executing a startup program on a computer, the startup program being stored on an external storage device connected with the computer;
    downloading, by the startup program, a file management program from a remote server to the computer; and installing the file management program on the computer;
    sending, by the startup program or the file management program, a message to a cloud storage management server requesting the creation of a cloud storage account associated with the external storage device;
    receiving, by the file management program, an indication that the cloud storage account has been created; and
    receiving, by the file management program, a command from a user to transfer a file from a memory of the computer to the external storage device connected to the computer;
    if a size of the file is greater than a threshold value:
        directly uploading, by the file management program, the file from the memory of the computer connected to the external storage device to a cloud storage location along with an indication of the cloud storage account;
    otherwise:
        storing, by the file management program, the file from the memory of the computer in the external storage device;
        detecting, by a system program running on the computer, that the file is being stored to the external storage device; and
        upon detecting that the file is being stored to the external storage device, uploading, by the file management program and from the external storage device, the file to the cloud storage location along with the indication of the cloud storage account.

2. The method according to claim 1, wherein the message includes a unique identifier associated with the external storage device.

3. The method according to claim 1, wherein the message includes a value specifying the size of the external storage device.

4. The method according to claim 1, further comprising sending a request to a remote program store requesting the file management program.

5. The method according to claim 4, further comprising executing the file management program to enable communication of information between the computer and the cloud storage location.

6. The method according to claim 1, wherein the external storage device includes a solid state hard drive, a USB memory stick, a magnetic hard disk drive, flash memory, or one or more spinning disks.

7. The method according to claim 1, wherein the external storage device is in wireless communication with the computer.

8. The method according to claim 1, wherein the cloud storage management server is in communication with cloud storage devices distributed geographically.

9. A system, comprising:
    an external storage device in communication with a computer, the computer in communication with a network, the external storage device comprising a startup program stored on the external storage device, configured to be executed by the computer to at least:
        request a file management program stored in a program store;

execute the file management program to enable communication of information between the computer and a cloud storage location; and request, by the startup program or the file management program, creation of a cloud storage account associated with the external storage device, the request for the creation of the cloud storage account being carried out after the request for the file management program in the program store and after the execution of the file management program to enable communication between the computer and the cloud storage location, upon receiving, by the file management program, a command from a user to transfer a file from a memory of the computer to the external storage device in communication with the computer, a determination is made, by the file management program, as to whether a size of the file is greater than a threshold value; and if the size of the file is greater than the threshold value:

the file is directly uploaded, by the file management program, from the memory of the computer in communication with the external storage device to the cloud storage location along with an indication of the cloud storage account;

otherwise:

the file from the memory of the computer is stored, by the file management program, in the external storage device and uploaded, from the external storage device, to the cloud storage location along with the indication of the cloud storage account.

10. The system of claim 9, wherein the startup program is further configured to include a unique identifier that identifies the external storage device with the request for creation of the cloud storage account.

11. The system of claim 9, wherein the external storage device is further configured to communicate with the cloud storage location associated with the cloud storage account.

12. The system of claim 9, wherein the cloud storage location is a distributed storage location that includes a plurality of storage locations distributed geographically.

13. The system of claim 9, wherein the external storage device is in wireless communication with the computer.

14. The system of claim 9, wherein the startup program is further configured to include a storage size of the external storage device with the request for the creation of the cloud storage account.

15. A non-transitory computer-readable storage medium including instructions that cause a computer in communication with the computer-readable storage medium to:

execute a startup program, stored in an external device connected to a computer, that is configured to:

request a file management program stored in a program store; and execute the file management program to enable communication of information between the computer and a cloud storage device; and request, by the startup program or the file management program, creation of a cloud storage account associated with the external storage device, the request for the creation of the cloud storage account being carried out after the request for the file management program in the program store and after the execution of the file management program to enable communication between the computer and the cloud storage device, upon receiving, by the file management program, a command from a user to transfer a file from a memory of the computer to the external storage device in communication with the computer, a determination is made, by the file management program, as to whether a size of the file is greater than a threshold value; and if the size of the file is greater than the threshold value:

the file is directly uploaded, by the file management program, from the memory of the computer in communication with the external storage device to the cloud storage location along with an indication of the cloud storage account;

otherwise:

the file from the memory of the computer is stored, by the file management program, in the external storage device and uploaded, from the external storage device, to the cloud storage location along with the indication of the cloud storage account.

16. The non-transitory computer-readable storage medium of claim 15, wherein the startup program is further configured to include a unique identifier that identifies the external storage device with the request for creation of the cloud storage account.

17. The non-transitory computer-readable storage medium of claim 15, wherein the cloud storage location is a distributed storage location that includes a plurality of storage locations geographically distributed.

18. The non-transitory computer-readable storage medium of claim 15, wherein the startup program is further configured to include a storage size of the external storage device with the request for the creation of the cloud storage account.

* * * * *